(12) United States Patent
Piskorz et al.

(10) Patent No.: US 8,436,120 B2
(45) Date of Patent: May 7, 2013

(54) METHOD OF PRODUCING HODGE CARBONYLS AND OLIGOMERIC LIGNIN

(76) Inventors: Jan Piskorz, Waterloo (CA); Piotr Majerski, Waterloo (CA)

( * ) Notice: Subject to any disclaimer, the term of this patent is extended or adjusted under 35 U.S.C. 154(b) by 985 days.

(21) Appl. No.: 11/943,422

(22) Filed: Nov. 20, 2007

(65) Prior Publication Data

US 2009/0126433 A1 May 21, 2009

(51) Int. Cl.
*C10J 3/68* (2006.01)
*C08H 7/00* (2011.01)
*C10B 49/02* (2006.01)
*C08L 97/02* (2006.01)
*A01N 25/26* (2006.01)
*B32B 1/06* (2006.01)

(52) U.S. Cl.
USPC .............. 527/400; 48/197 R; 71/23; 71/27; 71/64.07; 127/37; 201/14; 428/402; 527/403; 530/500

(58) Field of Classification Search .............. 71/23–30; 127/37; 530/500; 48/197 R; 201/14; 527/403, 527/400; 428/402
See application file for complete search history.

(56) References Cited

U.S. PATENT DOCUMENTS

| | | | | | |
|---|---|---|---|---|---|
| 3,186,923 | A | * | 6/1965 | Lyness | 201/25 |
| 4,069,024 | A | * | 1/1978 | Fernandes | 48/197 R |
| 4,579,579 | A | * | 4/1986 | Kerr | 71/23 |
| 4,880,473 | A | * | 11/1989 | Scott et al. | 127/37 |
| 5,676,727 | A | * | 10/1997 | Radlein et al. | 71/12 |
| 2008/0016769 | A1 | * | 1/2008 | Pearson | 48/197 R |

OTHER PUBLICATIONS

Piskorz et al., "Fast pyrolysis of sweet sorghum annd sweet sirghunm bagasse", 1998, Journal of Analytical and Applied Pyrolysis, vol. 46, p. 15-29.*
Scott et sl., "A second look at fast pyrolysis og biomass—the RTI process", 1999, Journal of Anaalytical and Applied Pyrolysis, vol. 51, p. 23-27.*
Sagehashi et al. "Superheated steam pyrolysis of biomass eleental components and Sugi (Japanese cedar) for fuels and chemicals" 2006 Bioresource Technology, 97, p. 1272-1283.*
Garcia et al. "Use of Kraft Pine Lignin in Controlled-Release Fertilizer Foumulations", 1996, Ind.Eng.Chem.Res, 35, p. 245-249.*
Scott et al. "A second look at fast pyrolysis of biomass—the Rti process" 1999, Journal of Analytical and Applied Pyrolysis, 51, p. 23-37.*
Felder et al. "Elementary Principles of Chemical Processes", 2000, John Wiley & Sons, Third edition, p. 644-651.*

* cited by examiner

*Primary Examiner* — Wayne Langel
*Assistant Examiner* — Syed Iqbal

(57) ABSTRACT

A method of treating biomass feed by pyrolyzing it in the presence of superheated steam at a selected temperature for a sufficient time to produce at least one product stream.

14 Claims, 2 Drawing Sheets

METHOD OF PRODUCING HODGE CARBONYLS AND OLIGOMERIC LIGNIN

FIELD

The present invention relates to a method of converting biomass by pyrolyzing feed in the presence of steam (hydrous thermolysis) to produce (1) a stream of water-soluble Hodge' carbonyls, (2) a stream of water insoluble-oligomeric lignin and (3) a stream of charcoal particulates.

BACKGROUND

Since the late seventies, many researchers and developers have concentrated on fast pyrolysis of biomass, also termed flash, ultra, rapid, and ablative pyrolysis of biomass. Most often—"flash pyrolysis consists of an operation wherein the dried, comminuted substantially organic fraction is combined with a particulate solid source of heat and a carrier gas which is non-reactive or non deleteriously reactive with respect to the product of pyrolysis under turbulent flow conditions in a flash pyrolysis zone maintained at a temperature from about 600 deg. F. to about 2000 deg. F. by the flow of a solid particulate source of heat there through" as in U.S. Pat. No. 4,260,473 issued to H. S. Bauer.

Attempts have been made by Occidental Research Corporation to commercialize a waste flash pyrolysis process. These attempts were not successful.

Most initiatives involving fast pyrolysis, after those of Occidental Research Corporation, were aimed at the production of biomass-based homogeneous liquids, considered as potential liquid fuels in stationary applications. After about 25 years of effort, the commercial potential of liquid fuel often named "bio-oil" has not yet been fully realized, although some attempts for replacement of bunker C and heating oil #2 were reported.

"Bio-oils", as produced by fast pyrolysis, are not considered applicable as transportation fuels. They have heating values similar to that of the original biomass (but those are only approximately 60% of the higher heating value (HHV) of bunker C, on a volumetric basis). Thus, if these oils are not transportation fuels, then it is difficult to understand why dry and ground biomass is not burned directly (in a variety of boilers) instead of going through a rather costly pyrolysis step first to produce a new liquid boiler fuel—bio-oil. On the other hand, it seems, there can be a valid strategy to direct pyrolytic processing towards particular fractions or specific chemicals. For such a strategy, if adopted, critical requirements like homogeneity or a low water content, of importance in fuel applications, are no longer as relevant or a prerequisite.

From earlier work in the field, the following pyrolysis related products have been discovered:

1. Hodge' carbonyls—the main biomass carbohydrate polymers, cellulose and hemicellulose (holocellulose) upon fast pyrolysis conditions, above 480 deg C., convert to carbohydrate fragments like hydroxyacetaldehyde, glyoxal, methylglyoxal, acetol, formaldehyde (Hodge' carbonyls). Those components have high water affinity and are water soluble. Hodge' carbonyls are finding applications in food industry, as a water base solvents, as pesticides, in formulations of silver-containing inkjet inks, as desulfurization and odour removal agents, as polymer precursors (polyesters of high boiling points), in glycolic acid production etc.
2. Oligomeric lignin—the most abundant aromatic polymer in nature, lignin, under fast pyrolysis conditions, breaks downs to oligomeric molecular fragments—"oligomeric lignin" containing circa 2-20 aromatic rings of molecular weight in the range of 400-2500 Daltons. This chemical fraction is water insoluble, odorless and rather non-volatile. There is a strong analogy/similarity between oligomeric lignin and humic acids. Humic acids are arguably the most important part of the soil. Both, oligomeric lignin and humic acids are products of lignin-polymer degradation. The exact chemical structures of both substances have not been established.
3. Pyrolytic char: See U.S. Pat. No. 5,676,727 issued to Radlein—"The pyrolytic char, which as a by-product of the pyrolysis process, has a high content of oxygenated functional groups and, in fact, represents a partially activated carbon. It may, therefore, serve not only as an absorbent, but may also bind nitrogen directly by reaction with $NH_2$ groups".
4. Pyrolytic water—in all pyrolytic processing (of biomass) the main product is 'pyrolytic water' which is a product of thermal dehydration. The dehydration reactions can lead to highly undesired products like polyaromatic hydrocarbons (PAH), soot and coke.

Methods of fast pyrolysis of biomass as practiced by emerging energy companies use an almost dry biomass feed and typically yield homogeneous "oils", commonly called bio-oils. The oils contain mainly a variety of carbonyls/acids, pyrolytic lignin and water. Char is considered as a by-product. The pyrolytic water yield (often underestimated by researchers) is typically over 12-16 wt % on a dry biomass basis. Such pyrolytic water yield indicates the occurrence of dehydration reactions taking place during pyrolysis.

As set forth in US Patent Application No. 2004/0108251, a criticism of fast pyrolysis schemes is the need to circulate very high volumes of inert gas in order to transport the inorganic heat supplying material at a mass ratio versus the carbonaceous feedstock in the range of 12:1 to 200:1.

When the recycle gas stream in such volumes is required to transport the sand and biomass—such transport of gas increases the size and complexity of the entire pyrolysis recovery system. The required expenditure of energy to operate recycle blowers and compressors makes the pyrolysis operation very noisy, energy inefficient and often troublesome. The fouling of blowers and compressors is a common occurrence reported by the industry.

Steam usage in fast pyrolysis towards energy products (fuels) was never considered because the steam-water usage dilutes the liquid fuel—bio-oil, causing phase separation, non-homogeneity, a lowering of BTU value, etc. However, for non-bio-oil targeted processing, as found out in this application, steam has a number of advantages. For example, steam enhances the removal of non-volatile chemical species (oligomeric lignin) from the reaction/pyrolysis zone due to their enhanced volatility with steam. Steam also tends to minimize thermal dehydration/condensation reactions occurring during pyrolysis and during condensation steps lessening yields of pyrolytic water. Polyaromatic hydrocarbons (PAHs), soot and coke yields are minimized. Steam increases yields of Hodge' carbonyls. Volumes of highly explosive and poisonous gases are no longer in re-circulation.

It has been found that pyrolytic charcoal absorbs a melt of oligomeric lignin. It is an object to use such composite as a base in a variety of soil enhancers and fertilizer formulations.

An object of this invention is to provide thermal processing while minimizing dehydration reactions.

An object of this invention is to provide a simplified method of producing Hodge' carbonyls and oligomeric lignin in improved yields and at lower costs.

Another object of this invention is to improve and utilize properties of pyrolytic char as an absorbent.

Still another object of this invention is to provide a method of using oligomeric lignin and pyrolytic char in novel formulations of slow release, carbon containing fertilizers by combining them with commercial N, P, K fertilizers like liquid and gas ammonia, ureas, polyureas, or ammonium, sodium, potassium nitrates or carbonates and similar, including nitrogen and phosphorous rich sludges, manures, and litters.

A further object of this invention is to enhance the economic viability of biomass conversion processes, especially as an integral part of a "bio-refinery", by providing a method for utilization of different parts of liquid and solid products.

A still further object of this invention is to provide a new product formulae leading to economically viable, high value partially organic "N, P, K, —C" slow release fertilizers which also can return bio-carbon to the soil (carbon sequestration in form of solid organic carbon).

Another object of this invention is to provide a water solution of Hodge' carbonyls, potential feedstock for transportation fuel production, by means of well known processes like steam co-reforming of methane, gasification towards Fischer-Tropsch synthesis (Sasol), NREL catalytic hydrogen production, aqueous phase reforming and other similar processes, see Czernik, S., French R., Feik, C., Chornet E., —"Hydrogen by Catalytic Steam Reforming of Liquid By-Products from Biomass Thermo-Conversion Processes", Ind. Eng. Chem. Res. 41, 4209-4215 (2002) and G. W. Huber, J. A. Dumesic, —"An overview of aqueous-phase catalytic processes for production of hydrogen and alkanes in a biorefinery", Catalysis Today, 111, 119-132 (2006).

SUMMARY OF THE INVENTION

There is provided a method of treating biomass feed by fast pyrolyzing it in the presence of superheated steam to produce at least one product stream.

A plurality of product streams are produced at selected temperatures which include Hodge' carbonyls, oligomeric lignin and bio-char particulates.

In the first instance, preferably, the biomass feed materials are cellulosics containing a low lignin content.

The cellulosics may be selected from the group consisting of cellulosic pulps, microcrystalline cellulose (e.g., Avicel), marketable cellulose powders (e.g., Iotech cellulose, Schleicher & Shuell, and also Whatman) and even cellulosic sludges. For such feeds the main product stream is a solution of Hodge' carbonyls. Also, for such feeds product streams of charcoal particulates (bio-char) and oligomeric lignin are minimized (yields of 10 wt % or less).

Anhydrosugar—levoglucosan is a minor component (usually below 2 wt %).

Steam or a steam-inert gas mixture is used at pyrolysis temperatures in the range of 490 to 590 degrees C.

In the second instance, preferably the biomass feed is lignocellulosics. Steam or steam-inert gas mixture is used at pyrolysis temperatures of 430 to 550 deg C.

Examples of lignocellulosics are forest and agricultural biomass like wood chips, barks, straw, stalks, husks, chaff, hulls, grasses, shives, needles, vine prunings, yew clippings, waste paper, organosolve lignin and similar.

At this instance the main product streams are:
1. Oligomeric lignin (wet); —water-insoluble phase
2. Water-rich phase containing Hodge' carbonyls, acetic and formic acids, and partially water-soluble phenolics—homologs of syringol and guiacol.
3. Bio-char (charcoal, bio-carbon, agrichar)

It is judged in this invention that the oligomeric lignin and oligomeric lignin in combination with char can be used to procure bio-carbon rich, slow release "N, P, K—C" fertilizers, soil enhancers and similar solid-organic-carbon (SOC) containing products. The utilization of whole fast pyrolysis bio-oil, in a procurement of nitrogen-slow-release fertilizer is described in U.S. Pat. No. 5,676,727 issued to Radlein, Piskorz, and Majerski.

In another aspect of the invention there is provided a product of the fast pyrolysis of biomass feed, comprising charcoal mixed/combined with oligomeric lignin.

The product of the fast pyrolysis of biomass feed, may also be oligomeric lignin and oligomeric lignin in combination with bio-char to form a soil enhancer.

The product of the fast pyrolysis of biomass feed, may also be oligomeric lignin melt coating N, P, K, fertilizers making them into a slow or controllable release type of fertilizer.

BRIEF DESCRIPTION OF THE DRAWINGS

Further features and advantages will be apparent from the following detailed description, given by way of example, of a preferred embodiment taken in conjunction with the accompanying drawings, wherein.

DESCRIPTION OF A PREFERRED EMBODIMENT

Figure 1:
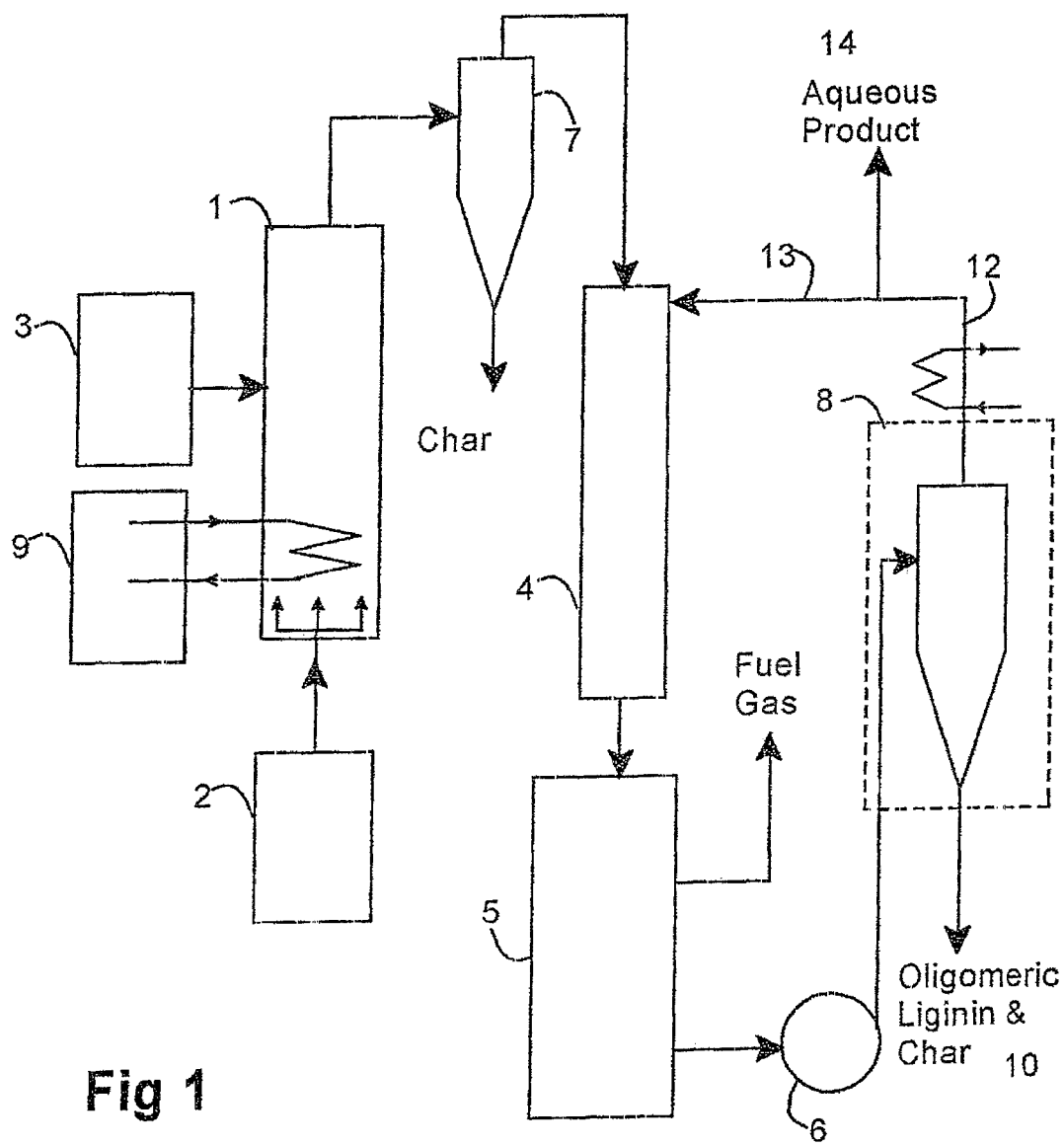
FIG. 1 is a schematic drawing of an apparatus for fast hydrous pyrolysis of biomass.

Referring to FIG. 1, the system used for the pyrolysis "in-steam" consists of a pyrolyzer 1 coupled to a feed source 3 and to a source of superheated steam 2. The steam and external heaters 9 heat the feed material to a temperature high enough so that degradation occurs. Energy input to the steam source 2 and to the pyrolyzer 1 can be effected by heaters 9 running on product gas, on propane/butane/natural gas, solid fuels or electricity. The product stream from the pyrolyzer 1 is directed to a cyclone separator 7 which separates the char and then to a scrubber 4 which removes all condensibles including water. The output from the scrubber 4 is directed to a surge tank 5 where product gas (mostly carbon monoxide and carbon dioxide) is removed.

The surge tank liquid slurry is directed by a pump 6 to a phase separation device 8 such as a hydroclone, or centrifuge yielding the stream of oligomeric lignin (heavier, tarry phase) 10 and the aqueous phase stream 12 containing Hodge' carbonyls/acids and water-soluble phenolics. A part of the aqueous stream 13, after extra cooling by heat exchanger 11, is directed to the scrubber 4.

Figure 2:
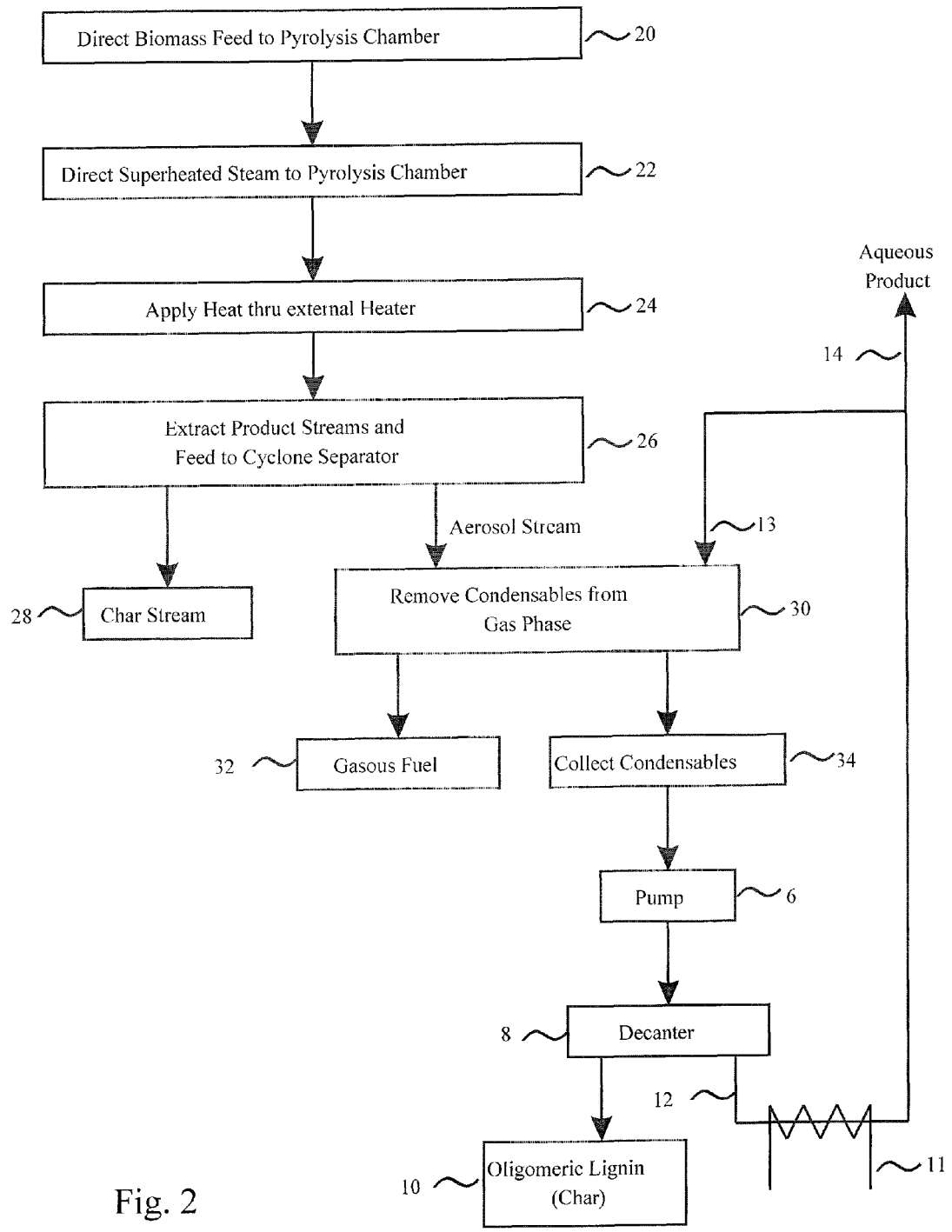
FIG. 2 is a flow diagram showing the process of FIG. 1.

The process of pyrolyzing biomass in the presence of superheated steam is shown in FIG. 2. Biomass feed is directed from the feed source 3 to the pyrolyzer 1 at step 20. At the same time superheated steam from the steam source 2 is directed to the pyrolyzer 1 at step 22. At step 24 heat from an external heat supply 9 is applied to heat the feed material to raise its temperature high enough so that degradation occurs. At step 26 the product streams are extracted and fed to a cyclone separator 7 which separates the char (bio-char) 28 and sends the remaining aerosol stream to the scrubber 4. At step 30 droplets, particulates, vapors are removed from the gas phase by the scrubber 4. The gas stream (mostly carbon monoxide and carbon dioxide) is extracted from the surge tank 5 at step 32 while at step 34 oligomeric lignin rich stream (tarry) and Hodge' carbonyls stream (watery) are collected. The separation of these two streams is achieved by directing all scrubber condensables from the surge tank 5 by pump 6 to decanter device 8. Oligomeric lignin and some char are removed from the decanter 8 at one end and an aqueous product stream 14 is removed at the other end. An additional cooling 11 is applied to the aqueous product stream 14 before it is returned to the scrubber 4 along line 13.

There are a number of additional advantages of this processing. It is possible to process biomass having a high moisture content like leaves, branches, yard waste, brush. Also, agricultural residua of high ash and nitrogen content can be processed. It is well known that such feeds are not optimal for bio-oil-energy targeted thermal conversions.

There are additional engineering advantages of using steam in the present application. For example, there is no need for recycle gas clean-up devices like filters, electrostatic precipitators, packed bed scrubbers-demisters. Such devices put additional (parasitic) energy demands on blowers/compressors. The presence of steam-water modulates pyrophillic properties of char-solids facilitating its safe removal/transport. The self-cleaning attributes of steam are of importance in keeping the recovery train unblocked. There is general simplicity of operation that requires only a farm level of technical sophistication. There is no start-up liquid medium required. The high temperature steam equipment and accessories required have an off-the-shelf availability.

The technological consequences of using steam, apart from a lowering pyrolytic water yield, is a lower gas-product yield. Also, water improves the thermal stability of both liquid fractions. The presence of water minimizes phenol-formaldehyde-like condensation reactions and aldol condensation reactions.

Cellulosic Pyrolysis

EXAMPLE 1

The object of this example is to demonstrate an augmented yield of key Hodge' carbonyls, hydroxyacetaldehyde and glyoxal, resulting from the pyrolysis of Avicel cellulose in steam versus non-steam processing.

TABLE 1

Cellulose pyrolysis. Avicel.
Yields of hydroxyacetaldehyde and glyoxal
Wt %, on dry feed base

| Temperature deg C. | Hydroxyacetaldehyde | Glyoxal |
|---|---|---|
| I. STEAM in use | | |
| 575 | 16.9 | 4.2 |
| 550 | 19.2 | 2.9 |
| 525 | 16.3 | 4.4 |
| II. NO STEAM in use | | |
| 600 | 12.1 | 3.4 |
| 550 | 10.9 | 4.0 |
| 525 | 10.6 | 3.7 |
| 475 | 4.9 | 0.3 |

The yields of hydroxyacetaldehyde, in particular, are consistently larger when cellulose is processed in steam.

EXAMPLE 2

The object of this example is to demonstrate the augmented yields of Hodge' carbonyls from bleached pulps

TABLE 2

Pyrolysis feed - bleached pulp (Tembec)
Temperature - 550 deg C.
Yields, wt %, dry feed basis

| | Steam processing | Non-steam processing |
|---|---|---|
| Run # | 220 | 222 |
| Hydroxyacetaldehyde | 18.0 | 10.7 |
| Glyoxal | 4.1 | 1.5 |
| Acetol | 2.0 | 2.0 |
| Formaldehyde | 5.1 | 3.6 |

Yields of key Hodge' carbonyls are consistently higher in steam processing.

EXAMPLE 3

The objective of Example 3 is to demonstrate elevated-augmented yields of Hodge carbonyls in a specified temperature above 490 deg C.

TABLE 3

Pyrolysis feed - unbleached pulp and cellulosic sludge from clarifier (Tembec) Steam processing
Yields, wt % dry basis

| | Feed | | | |
|---|---|---|---|---|
| | Pulp | Pulp | Pulp | Sludge |
| Temperature, deg C. | 450 | 500 | 550 | 500 |
| Glyoxal | Trace | 2.1 | 1.8 | 0.9 |
| Methylglyoxal | Trace | 0.9 | 0.8 | |
| Hydroxyacetaldehyde | 6.4 | 12.0 | 12.0 | 11.0 |
| Formaldehyde | 6.7 | 7.7 | 5.9 | |
| Acetol | 2.8 | 4.7 | Nd | 2.5 |

The table illustrates, that cellulosic pulps and sludges can be pyrolyzed, preferably at 500-550 deg C., to yield Hodge' carbonyls Lignocellulosics Pyrolysis

EXAMPLE 4

The objective of example 4 is to demonstrate elevated yields of Hodge' carbonyls and oligomeric lignin from lignocellolosics when applying steam processing utilizing as a feed a British Columbia fir-spruce (softwood) mix.

TABLE 4

Yields, wt %, dry basis

| | Run # | |
|---|---|---|
| | 224 | 226 |
| Temperature, deg C. | 485 | 460 |
| Atmosphere | Nitrogen | Steam, Nitrogen |
| Char | 10.9 | 11.8 |
| Oligomeric lignin | 19.6 | 22.3 |
| Glyoxal | 0.8 | 1.4 |
| Hydroxyacetaldehyde | 12.5 | 15.0 |
| Formaldehyde | 2.2 | 2.4 |

Again, steam processing yielded relatively more Hodge' carbonyls and, also this time in the case of lignocellulosics more oligomeric lignin.

EXAMPLE 5

Example 5 compares steam processing of hardwoods (beech) with processing without steam for different temperatures.

Apparent vapour residence time ~1 second

TABLE 5

Yields, wt %, dry feed basis

| | Temperature, deg C. | |
|---|---|---|
| | 435 | 425 |
| Atmosphere | Nitrogen | Steam, Nitrogen |
| Char | 15.1 | 10.9 |
| Oligomeric lignin | 16.5 | 23.0 |
| Glyoxal | 2.0 | 2.2 |
| Hydroxyacetaldehyde | 7.1 | 8.6 |

| | Temperature, deg C. | |
|---|---|---|
| | 485 | 475 |
| Atmosphere | Nitrogen | Steam, Nitrogen |
| Char | 9.3 | 8.3 |
| Oligomeric lignin | 18.0 | 28.0 |
| Glyoxal | 2.0 | 2.0 |
| Hydroxyacetaldehyde | 9.5 | 9.5 |

| | Temperature, deg C. | |
|---|---|---|
| | 530 | 545 |
| Char | 6.3 | 6.0 |
| Oligomeric lignin | 25.0 | 25.0 |
| Hydroxyacetaldehyde | 7.7 | 8.0 |
| Levoglucosan | 2.2 | 1.0 |

Again, for hardwoods, steam processing increases yield of oligomeric lignin, particularly when processed at temperature of 475 deg C.

Hodge carbonyls yield is affected only slightly.

EXAMPLE 6

Rice Straw Processing

The object of this example is to illustrate the advantageous effects of steam use in limiting dehydration reaction (less pyrolytic water production) and elevated yields of overall pyrolytic condensables (water-less organics)

TABLE 6

Yields, Wt % dry, ash free basis

| | Run # | |
|---|---|---|
| | 236 | 238 |
| Atmosphere | Nitrogen | Steam/Nitrogen |
| Temperature, deg C. | 490 | 475 |
| Pyrolytic water | 21.5 | 18.1 |
| Organic condensables | 37.9 | 43.2 |
| Gases | 19.0 | 16.6 |
| Char | 18.2 | 17.5 |

Steam processing lowered yields of pyrolytic water and gas.

EXAMPLE 7

Oligomeric lignin (humus analog/precursor) and char yields are of interest when formulating proposed soil enhancers/fertilizers containing organic carbon.

The following table sets forth a summary of experimental work showing typical yields of chars and oligomeric lignin upon fast pyrolysis with steam processing at ~500 deg C.

TABLE 7

Yields, wt % (on moisture, ash free basis)

| Biomass | Pyrolytic CHAR | Oligomeric LIGNIN |
|---|---|---|
| Corn Bran | 11 | 9 |
| Corn Hulls | 11 | 12 |
| Corrugated Cardboard | 12 | 12 |
| Sugar Cane Bagasse | 12 | 13.5 |
| Giant Reed | 14 | 14 |
| Willow Coppice | 12 | 17 |
| Flax Straw | 15 | 15 |
| Oats Hulls | 13 | 18 |
| Switch Grass | 14 | 16 |
| Hemp | 16 | 16 |
| Miscanthus | 13 | 19 |
| Corn Stover | 15 | 20 |
| Distiller's Grain | 17 | 20 |
| Flax Shives | 16 | 22 |
| Olive Pits | 16 | 24 |
| Coffee Waste | 16 | 24 |
| Sewage Sludge | 20 | 34 |
| Pine Brush | 18 | 35 |
| Pine Needles | 25 | 29 |

EXAMPLE 8

Example 8 deals with fast pyrolysis of a spruce-fir mix in steam. The products obtained, namely, charcoal and oligomeric lignin, were mixed together in weight proportion 30-70, respectively. At a temperature of ~45 deg C. the oligomeric lignin melt was absorbed totally by the charcoal. The charcoal retained the original particle size. Its bulk density increased more than 3 times.

Such a dual product-component, charcoal+oligomeric lignin, can be considered as a flexible matrix in the formulation of fertilizers, a matrix in which a range of nutrients and additives could be included. Thus, a unique and valuable fertilizer for agricultural and horticultural applications can simply be specified and then formulated.

Judging from the examples 7 and 8 one can conclude that 20 to 50% of biomass could be converted to a novel oligomeric lignin and char composite wherein the lignin and the char are physically combined. Such composite could be utilized as a novel soil enhancer, rich in SOC (soil organic carbon). Such composite can be utilized also (by adopting known-art) to formulate a variety of fertilizers with specified nitrogen, phosphorous, and potassium content. In particular, oligomeric lignin melt is suitable to be used as a coating of commercially available solid N. P, K fertilizers making them into a slow or controllable release type. A novel fertilizer formulae, this time, including an element carbon is described by the 4-letters "N, P, K and C".

EXAMPLE 9

This example also deals with fast pyrolysis of a spruce-fir mix in steam. However, in this case a no cyclone with a condensing trapping unit is used in the recovery train to separate char particles.

Steam:biomass (dry) ratio 1:1.

The following two separate streams of products were targeted.

1. Hodge carbonyls in a yield of 50 wt % on a dry wood basis, in water. The water content of the actual product is ~50 wt %.
2. Char—oligomeric lignin solids. The charcoal particulates contain all oligomeric lignin in their bulk volume. The yield of char+oligomeric lignin on a dry biomass basis is 32 wt %. As produced this stream is still wet with approximately 27 wt % water.

The example teaches, that even more simplified processing, this time without cyclonic char particulate separation, could be adopted, if judged sufficient for a targeted products spectrum.

The following enumerated statements provide a partial summary of the steps of a fast pyrolysis method of producing a product stream from biomass according to the invention.

Statement 1. The invention includes a method of treating biomass feed, the method comprising the steps: fast pyrolyzing biomass feed in the presence of superheated steam at a selected temperature to produce at least one product stream.

Statement 2. The invention includes the method of Statement 1, wherein the temperature exceeds 400 degrees C.

Statement 3. The invention includes the method of Statement 1, wherein the first product stream includes a water slurry of produced charcoal particulates and oligomeric lignin.

Statement 4. The invention includes the method of Statement 1, wherein the product stream includes Hodge' carbonyls, oligomeric lignin and bio-char particulates.

Statement 5. The invention includes the method of Statement 4, wherein the Hodge' carbonyls are water soluble, carbohydrate-originated carbonyls.

Statement 6. The invention includes the method of Statement 4, wherein the Hodge' carbonyls include at least one of hydroxyacetaldehyde, glyceraldehydes, acetol, pyruvaldehyde, glyoxal, 5-hydroxymethylfurfural, furfurals, and formaldehyde Statement 7. The invention includes the method of Statement 1, wherein the biomass feed is cellulosics of low lignin content.

Statement 8. The invention includes the method of Statement 7, wherein the temperature is in the range of 490 deg. C. to 590 deg. C.

Statement 9. The invention includes the method of Statement 7, wherein the cellulosics are selected from the group consisting of cellulosic pulps and sludges, and micro-crystalline cellulose powders.

Statement 10. The invention includes the method of Statement 7, wherein the product stream is a water-soluble mix of Hodge' carbonyls with hydroxyacetaldehyde, glyoxal, methylglyoxal, formaldehyde, acetol, furfurals and 5-hydroxymethylfurfurals.

Statement 11. The invention includes the method of Statement 1 wherein the biomass feed is lignocellulosics.

Statement 12. The invention includes the method of Statement 11, wherein the temperature is in the range 430 -550 deg C.

Statement 13. The invention includes the method of Statement 11, wherein the lignocellulosics are selected from forestry, and agriculture produced biomass including waste and residua.

Statement 14. The invention includes the method of Statement 11, wherein a product stream of oligomeric lignin is produced.

Statement 15. The invention includes the method of Statement 11, wherein the second product stream is a soluble mix of Hodge' carbonyls with hydroxyacetaldehyde, glyoxal, methyl glyoxal, formaldehyde, acetol, furfurals and 5-HMF and includes formic and acetic acids and water-soluble phenolics.

Statement 16. The invention includes the method of Statement 1, wherein the oligomeric lignin and the bio-char are physically combined.

Statement 17. The invention includes the method of Statement 16, wherein said char has a high content of oxygenated functional groups and functions not only as an absorbent, but also binds nitrogen directly by reaction with $NH_2$ groups.

Statement 18. The invention includes a product of the fast pyrolysis of biomass feed, comprising charcoal combined with oligomeric lignin.

Statement 19. The invention includes a product of the fast pyrolysis of biomass feed, comprising oligomeric lignin and oligomeric lignin in combination with bio-char to form a soil enhancer.

Statement 20. The invention includes a product of the fast pyrolysis of biomass feed, comprising oligomeric lignin melt coating N, P, K, fertilizers making them into a slow or controllable release type of fertilizer.

Statement 21. The invention includes the product of Statement 20 including bio-carbon and described by the 4-letters N,P,K,C..

Accordingly while this invention has been described with reference to illustrative embodiments, this description is not intended to be construed in a limiting sense. Various modifications of the illustrative embodiment will be apparent to those skilled in the art upon reference to this description. It is therefore contemplated that appended claims will cover any such modifications or embodiments as fall within the scope of the invention.

We claim:

1. An improved fast pyrolysis method of the type used to decompose biomass into a non-bio-oil product, said fast pyrolysis method characterized by the steps of i) combining the biomass, a carrier gas, and a particulate solid source of heat in a pyrolysis chamber, ii) allowing the biomass to decompose during an apparent vapor residence time, and ii) collecting a product, wherein the improvement comprises the steps of:

Step (a) directing superheated steam into the pyrolysis chamber;
Step (b) applying to the pyrolysis chamber sufficient heat from an external source to raise the temperature in the chamber to at least about 430° C.;
Step (c) collecting a stream containing char;
Step (d) collecting an aerosol stream;
Step (e) producing a gas stream and a condensables stream from the aerosol stream of Step (d); and,
Step (f) separating the condensables stream of Step (e) into i) an aqueous product stream and ii) oligomeric lignin.

2. The improved method of claim 1, wherein the aqueous product stream of Step (f) includes at least one Hodge' carbonyl.

3. The improved method of claim 1, wherein the aqueous product stream of Step (f) includes at least one product selected from the group consisting of hydroxyacetaldehyde, glyceraldehydes, acetol, pyruvaldehyde, glyoxal, 5-hydroxymethylfurfural, furfurals, formaldehyde, and water-soluble phenolics.

4. The improved method of claim 1 wherein the apparent vapor residence time is approximately 1 second.

5. The improved method of claim 4 wherein the temperature of Step (b) is between approximately 430° C. and approximately 570° C.

6. The improved method of claim 1 wherein the temperature of Step (b) is between approximately 430° C. and approximately 570° C.

7. The improved method of claim 1 wherein the biomass includes a cellulosic material.

8. The improved method of claim 7 wherein the cellulosic material is selected from the group consisting of cellulosic pulps, cellulosic sludges, and micro-crystalline cellulose powders.

9. The improved method of claim 1 wherein the biomass includes at least one lignocellulosic material.

10. The improved method of claim 9 wherein the heat applied at Step (b) is sufficient to produce a temperature in the pyrolysis chamber in the range of approximately 430° C. to approximately 550° C.

11. The improved method of claim 1 further comprising:
Step (g) absorbing the oligomeric lignin of Step (f) onto the char of Step (c) whereby a composite of the oligomeric lignin and the char is produced.

12. Oligomeric lignin produced by the method of claim 1.

13. A solid fertilizer having a coating, wherein said coating comprises the oligomeric lignin of claim 1.

14. The composite of oligomeric lignin and char produced by the improved method of claim 11.

* * * * *

UNITED STATES PATENT AND TRADEMARK OFFICE
CERTIFICATE OF CORRECTION

PATENT NO. : 8,436,120 B2
APPLICATION NO. : 11/943422
DATED : May 7, 2013
INVENTOR(S) : Jan Piskorz et al.

Page 1 of 1

It is certified that error appears in the above-identified patent and that said Letters Patent is hereby corrected as shown below:

On the Title page under the heading "OTHER PUBLICATIONS":

Reference 1 - Piskorz et al.
 replace "annd sweet sirghumn" with -- and sweet sorghum --

Reference 2 - Scott et al.
 replace "Scott et sl." with -- Scott et al. --
 replace "og biomass" with -- of biomass --
 replace "Anaalytical" with -- Analytical --
 replace "p.23-27" with -- p.23-37 --

Reference 3 - Sagehashi et al.
 replace "eleental components and" with -- elemental components and --

Reference 4 - Garcia et al.
 replace "Foumulations" with -- Formulations --

Reference 5 - Scott et al. is a duplicate of reference 2 and should be deleted.

Signed and Sealed this
Second Day of July, 2013

Teresa Stanek Rea
*Acting Director of the United States Patent and Trademark Office*